US012607274B2

(12) United States Patent
Lai

(10) Patent No.: US 12,607,274 B2
(45) Date of Patent: Apr. 21, 2026

(54) FUEL PUMP FLOW PASSAGE STRUCTURE

(71) Applicant: Zhongshan Peili Technology Co., Ltd,
Zhongshan (CN)

(72) Inventor: Chunlai Lai, Ruijin (CN)

(73) Assignee: Zhongshan Peili Technology Co., Ltd.,
Zhongshan (CN)

( * ) Notice: Subject to any disclaimer, the term of this
patent is extended or adjusted under 35
U.S.C. 154(b) by 0 days.

(21) Appl. No.: 18/388,837

(22) Filed: Nov. 11, 2023

(65) Prior Publication Data

US 2025/0155041 A1     May 15, 2025

(51) Int. Cl.
    *F16K 24/06*      (2006.01)
    *F16L 55/07*      (2006.01)
(52) U.S. Cl.
    CPC .............. *F16K 24/06* (2013.01); *F16L 55/07*
                                              (2013.01)
(58) Field of Classification Search
    CPC . Y10T 137/2849; F16K 15/147; F16K 24/06;
            F16L 55/07; F16L 41/021; F16L 41/028;
                                              F16L 41/03
    See application file for complete search history.

(56) References Cited

U.S. PATENT DOCUMENTS

| | | | | |
|---|---|---|---|---|
| 5,765,595 | A * | 6/1998 | Ballun .................... | F04D 9/006 |
| | | | | 137/526 |
| 7,717,129 | B2 * | 5/2010 | Steppe .................. | F16K 15/147 |
| | | | | 137/846 |
| 11,421,810 | B2 * | 8/2022 | Terry ....................... | F16L 55/07 |
| 11,466,689 | B1 * | 10/2022 | Lai .......................... | F04D 9/007 |

FOREIGN PATENT DOCUMENTS

| | | | | | |
|---|---|---|---|---|---|
| GB | | 1375164 | A * | 11/1974 | ........... F16K 15/148 |
| WO | WO-2011058871 | A1 * | 5/2011 | ......... F16L 25/0036 |
| WO | WO-2014103514 | A1 * | 7/2014 | ............. F16K 27/00 |
| WO | WO-2021076470 | A1 * | 4/2021 | ............. B25B 27/10 |

OTHER PUBLICATIONS

Machine English translation of WO_2011058871_A1 (Year: 2025).*
Machine English translation of WO_2014103514_A1 (Year: 2025).*

* cited by examiner

*Primary Examiner* — Hailey K. Do
(74) *Attorney, Agent, or Firm* — Jose Cherson Weissbrot

(57)              ABSTRACT
A novel fuel pumpflow channel passage structure, which
comprises an adapter, an air vent valve and a sealing plug,
wherein the adapter comprises a body, an input end and an
output end; the input end is communicated with the output
end through the body; both the input end and the output end
have cylindrical inner wall surfaces roughly varying in axial
diameters; the input end and the output end define an input
pipeline and an output pipeline along the cylindrical inner
wall surfaces; the body is provided with an air vent hole and
a through hole; the air vent valve is arranged on the air vent
hole; and the sealing plug is arranged on the through hole.

16 Claims, 16 Drawing Sheets

1000

1001

1002

1003

1201

1202

1204          1206          1204

1203          1207

1205          1205

1000

1012

1012

2005

2000

2006

3000

1010     1014

FUEL PUMP FLOW PASSAGE STRUCTURE

TECHNICAL FIELD

The present invention relates to the technical field of oil pumps, in particular to a novel fuel pumpflow channel passage structure.

BACKGROUND

Pump, the function of which is to pump gasoline or diesel oil from the oil drum to the fuel equipment of vehicles, ships or machinery for operation, may also pump fuel oil from the fuel tank of mechanical equipment so as to facilitate operators to carry out subsequent maintenance, overhaul and other operations. Portable pump is widely used in various scenarios.

At present, the flow passage structure of the existing portable fuel pump in the market is mostly integrated with the pump housing, and the structure of its parts is complex, which leads to complicated production and assembly process and inconvenient operation, and also promotes the development and production cost of the mold to be too high. In addition, the oil inlet pipeline and the oil outlet pipeline of the traditional portable fuel pumpflow passage are zigzag corrugated pipelines, and the corrugated pipeline designed in this way will increase the resistance of fluid flow because of its unsmooth wall, thus affecting the flow rate and head of the pump body. In addition, there are air vent valves in the flow passage of the existing portable oil well pump, but the valves are all of two-way ventilation structure, which has complex structure and requires high accuracy of parts, and will cause oil leakage.

Based on this, it is necessary to put forward a brand-new fuel pumpflow passage, which is not only simple in structure, large in flow and long in lift, but also can effectively avoid the phenomenon of liquid leakage.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below; not this summary. This summary is a high-level overview of various embodiments of the invention and introduces some of the concepts that are further described in the Detailed Description section below: This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a practical and efficient modular fuel pumpflow channel passage structure, which includes an adapter, an air vent valve and a sealing plug; and
wherein the adapter comprises a body, an input end and an output end, wherein the input end is communicated with the output end through the body; and
wherein, both the input end and the output end have generally cylindrical inner wall surfaces roughly varying in axial diameters, and the input end and the output end define an input pipeline and an output pipeline along the cylindrical inner wall surfaces, wherein the input pipeline defines an input axis continuously passing through a pipeline center of the input pipeline, and the output pipeline defines an output axis continuously passing through a pipeline center of the output pipeline; and
wherein, the body is provided with an air vent hole, a hole center of the air vent hole is positioned in the axial direction of the input axis, and the body is also provided with a through hole, and a hole center of the through hole is positioned in the axial direction of the output axis; and
wherein, the air vent valve is arranged on the air vent hole, and the sealing plug is arranged on the through hole.

The present invention provides a novel fuel pumpflow channel passage structure, which includes an adapter, an air vent valve and a sealing plug; and
wherein the adapter comprises a body, an input end and an output end, wherein the input end is transverse to the output end, and the input end is communicated with the output end through the body; and
wherein, both the input end and the output end have cylindrical inner wall surfaces roughly varying in axial diameters, and the input end and the output end define an input pipeline and an output pipeline along the cylindrical inner wall surfaces, wherein the input pipeline defines an input axis continuously passing through a pipeline center of the input pipeline, and the output pipeline defines an output axis continuously passing through a pipeline center of the output pipeline; and
wherein, the body is provided with an air vent hole, a hole center of the air vent hole is positioned in an axial direction of the input axis, and the body is also provided with a through hole, and a hole center of the through hole is positioned in an axial direction of the output axis; and
wherein, the air vent valve is arranged on the air vent hole, and the sealing plug is arranged on the through hole.

The present invention provides a novel fuel pumpflow channel passage structure, which includes an oil inlet corrugated pipeline, a lead sealing plug, an adapter, an air vent valve and an oil outlet corrugated pipeline, wherein connecting ports at both ends of the adapter are respectively assembled and fixed by using clamping pieces: the oil inlet corrugated pipeline and the oil outlet corrugated pipeline are respectively assembled and fixed at connection ports at two ends of the adapter by using fastening pieces: the adapter is fixedly provided with an oil inlet pipeline of the oil inlet corrugated pipeline, and an end wall surface in the axial direction is provided with an air vent hole position: an air vent valve equipped with a air vent cap is arranged outside the air vent hole position: the adapter is fixedly provided with an oil outlet pipeline of the oil outlet corrugated pipeline, and the end wall surface in the axial direction of the adapter is provided with a through hole, and the lead sealing plug is installed in the through hole: an inner cavity wall of the fastening piece corresponds to the structure of the corrugated pipeline, and a corrugated structure for wedging and fixing is also integrally formed: outer walls at both ends of the adapter are integrally formed with annular bosses for the fastening piece to be fixedly installed.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
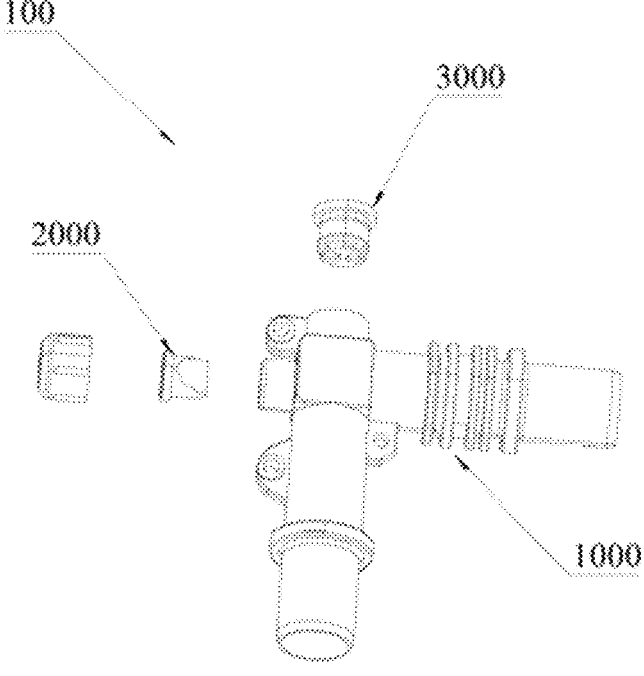
FIG. 1 is a schematic diagram of the overall explosion structure of the adapter.

1000, Adapter; 1001, Body; 1002, Input end; 1003, Output end; 1004, Cylindrical inner wall surface; 1005, Input pipeline; 1006, Output pipeline; 1007, Input axis; 1008, Output axis; 1009, Air vent hole; 1010, Through hole; 1011, Annular boss; 1012, Mounting hole; 1013, External thread; 1014, Concave part; 1101, Oil inlet pipeline; 1102, Oil outlet pipeline; 1201, Fastening device; 1202, Clamping piece; 1203, Buckling piece; 1204, Fastener; 1205, Groove; 1206, First inner wall surface; 1207, Second inner wall surface; 2000, Air vent valve; 2001, Air vent cap; 2002, First air vent hole; 2003, Boss; 2004, Internal thread; 2005, Ventilation end; 2006, Closed end; 3000, Sealing plug; 3001, Protruding part; 3002, Second air vent hole.

1, Oil inlet Corrugated pipeline; 4, Lead sealing plug; 5, Adapter; 6, Air vent valve; 2, Fastening piece; 21, First clamping piece; 22, First mating part; 23, Second clamping piece; 24, Second mating part 7, Air vent cap; 10, Oil outlet corrugated pipeline; 100, Oil inlet pipeline; 101, Air vent hole position; 200, Oil outlet pipeline; 201, Through hole; 300, Annular boss.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

The present invention discloses a practical and efficient modular fuel pumpflow channel passage structure, as shown in FIG. 1, which includes an adapter 1000, an air vent valve 2000 and a sealing plug 3000.

Figure 2:
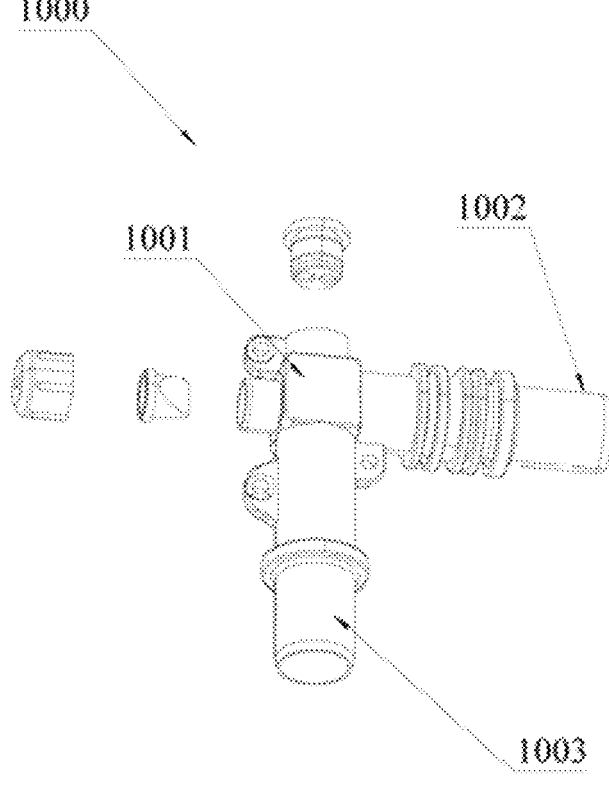
FIG. 2 is a schematic structural view of the adapter body.

In this embodiment, as shown in FIG. 2, the adapter 1000 includes a body 1001, an input end 1002 and an output end 1003, wherein the input end 1002 communicates with the output end 1003 through the body 1001.

Figure 3:
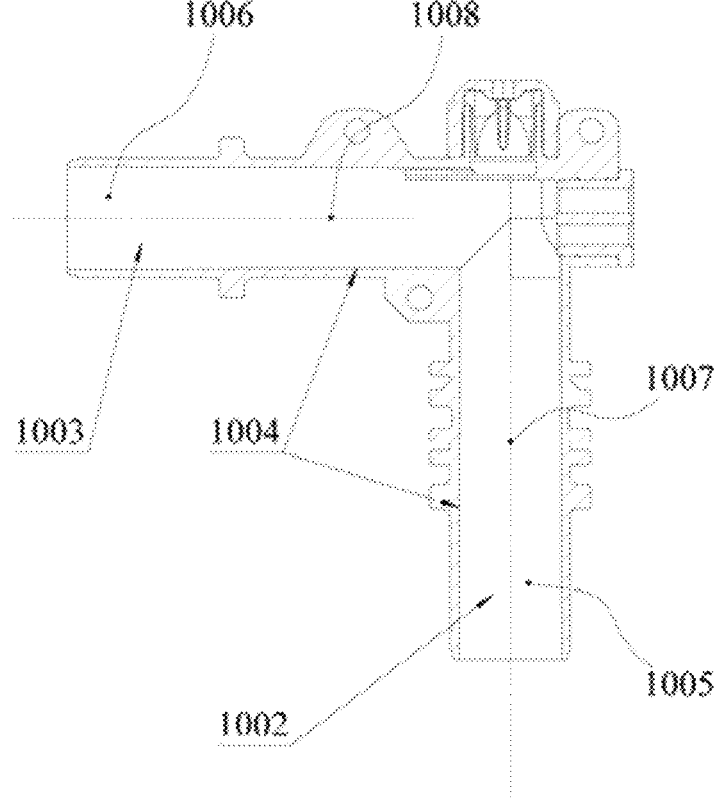
FIG. 3 is a schematic sectional view of the adapter.

In this embodiment, as shown in FIG. 3, both the input end 1002 and the output end 1003 have cylindrical inner wall surfaces 1004 with roughly varying in axial diameters, and the input end 1002 and the output end 1003 define an input pipeline 1005 and an output pipeline 1006 along the cylindrical inner wall surfaces 1004, wherein the input pipeline 1005 defines an input axis 1007 that continuously passes through the pipeline center of the input pipeline 1005, and the output pipeline 1006 defines an output axis 1008 that that continuously passes through the pipeline center of the output pipeline 1006.

Figure 4:
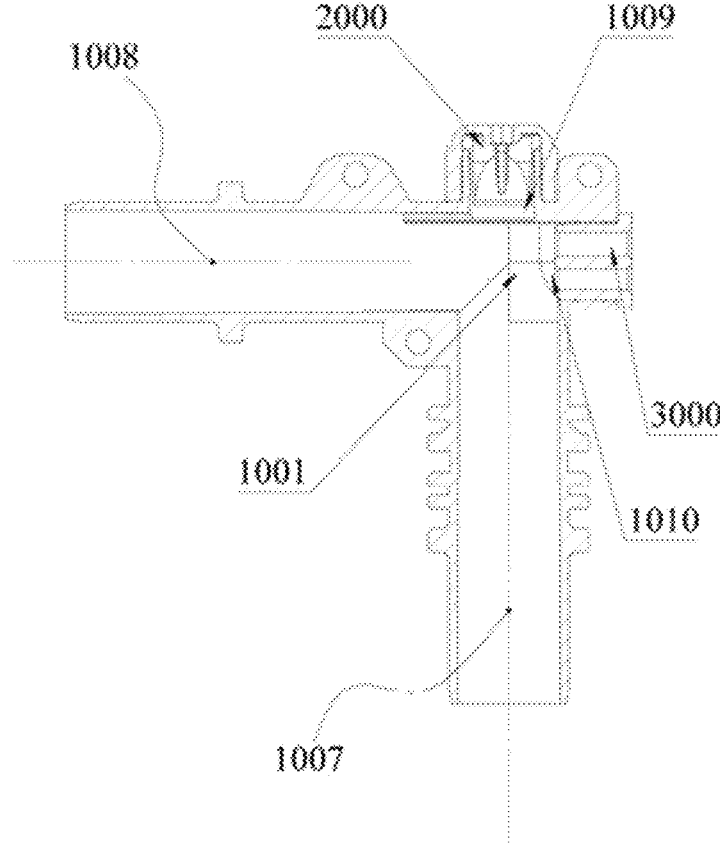
FIG. 4 is a schematic sectional view of the air vent valve and the sealing plug on the adapter.

In this embodiment, as shown in FIG. 4, the body 1001 is provided with an air vent hole 1009, the hole center of which is located in the axial direction of the input axis 1007, and the body 1001 is also provided with a through hole 1010, the hole center of which is located in the axial direction of the output axis 1008: the air vent valve 2000 is arranged on the air vent hole 1009, and the sealing plug 3000 is arranged on the through hole 1010.

Figure 5:
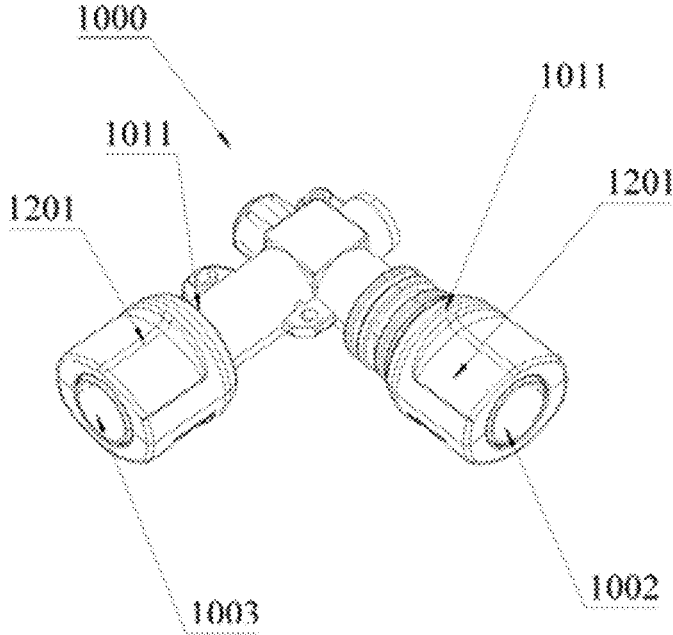
FIG. 5 is a schematic structural view of the annular boss on the adapter.

In this embodiment, as shown in FIG. 5, the input end 1002 and the output end 1003 are respectively provided with annular bosses 1011, which can provide stable support for the fastening device 1201, so that the fastening device 1201 is not easy to loosen or slide down during use, and the connection stability is enhanced. Moreover, the annular bosses 1011 make the installation and disassembly of the fastening device 1201 very convenient and fast, which greatly improves the use efficiency. At the rear end of the annular boss 1011 of the input end 1002, there are also several protrusions, which increase the friction coefficient of the adapter and make it easier for users to grasp and manipulate it. In addition, these protrusions also increase the cross-sectional area of the pipeline, thus increasing the rigidity of the device and preventing the pipeline from being deformed in high pressure and high temperature environment.

In another embodiment (not shown in the figures), rectangular bosses for fixedly installing the fastening device 1201 can also be arranged on the outer wall surfaces of both ends of the adapter 1000.

Figure 6:
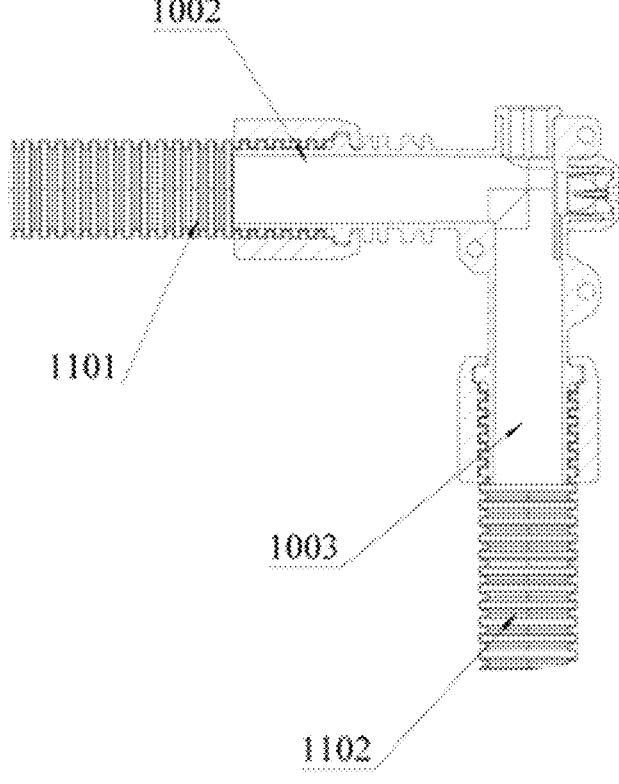
FIG. 6 is a schematic sectional view of the connection of the input end and the output end with the oil inlet pipeline and the oil outlet pipeline.

In this embodiment, as shown in FIG. 6, an oil inlet pipeline 1101 is communicated with the input end 1002, and an oil outlet pipeline 1102 is communicated with the output end 1003. The oil inlet pipeline 1101 and the oil outlet pipeline 1102 have corrugated structures at equal intervals. The outer diameters of the oil inlet pipeline 1101 and the oil outlet pipeline 1102 are larger than the inner diameters of the input end 1002 and the output end 1003, and the corrugated structures are arranged on the pipelines, which can effectively prevent oil leakage. Moreover, the corrugated hose has certain elasticity, which can absorb the vibration generated during the operation of the equipment, reduce the wear of the equipment, significantly improve the flow and lift of the oil pump, and reduce the working power of the motor, thus achieving energy-saving and high-efficiency effects. Because the outer diameters of the oil inlet pipeline 1101 and the oil outlet pipeline 1102 are larger than the inner diameters of the input end 1002 and the output end 1003, the oil inlet pipeline 1101 and the oil outlet pipeline 1102 can be directly plugged into the input end 1002 and the output end 1003, so that its connection is more convenient and quick, and at the same time, it can also reduce the outdated resistance of oil circulation, thus improving the fluidity of oil.

In other embodiments (not shown in the figures), the oil inlet pipeline 1101 and the oil outlet pipeline 1102 can be set as retractable corrugated hoses, which can adapt to the movement or vibration of the equipment and prevent the hoses from breaking due to stretching or squeezing. In other embodiments (not shown in the figures), the oil inlet pipeline 1101 and the oil outlet pipeline 1102 can be provided with insulation layers, which can prevent the oil temperature from being too high or too low and ensure the normal working performance of the oil.

In this embodiment, both the oil inlet pipeline 1101 and the oil outlet pipeline 1102 are made of corrosion-resistant metal materials, which have higher strength and can bear greater pressure, and are suitable for oil transportation in high-pressure environment. For example, the oil inlet pipeline 1101 and the oil outlet pipeline 1102 can be made of stainless steel, which has good corrosion resistance and strong mechanical strength, and the pipelines will not be deformed and damaged during oil transportation, which will otherwise affects the transportation efficiency.

In other embodiments (not shown in the figures), the oil inlet pipeline 1101 and the oil outlet pipeline 1102 can also be made of rubber materials with good flexibility, which can make the pipelines more flexible during installation and use. The rubber materials can absorb vibration and impact, which can reduce pipeline damage caused by vibration or impact during operation. In addition, the rubber materials have good sealing performance, which can prevent oil from leaking at the pipeline interface.

In this embodiment, the adapter 1000 is the core component, which plays the main role of adapter. The functions of several channels are different, such as connecting the oil inlet pipeline 1101 and the oil outlet pipeline 1102, connecting the air vent hole 1009 of the air vent valve 2000, and connecting the through hole 1010 of the sealing plug 3000. Each interface does not interfere with each other, which makes the assembly intuitive, simple and convenient. The whole device is modularized, and can be flexibly assembled into parts and then fixed on the pump shell, which is convenient for production and installation.

In this embodiment, the input end 1002 and the output end 1003 have a cylindrical structure, which not only simplifies the connection process of the equipment, but also enables the oil inlet pipeline 1101 and the oil outlet pipeline 1102 to be directly inserted or joined to the input end 1002 and the output end 1003, and is arranged in such a cylindrical structure that the internal pressure can be uniformly distributed, thereby reducing the equipment damage caused by pressure concentration.

In other embodiments, the input end 1002 and the output end 1003 are arranged in conical structures, which can provide good guiding performance and help reduce the turbulence and pressure loss of the fluid.

Figure 7:
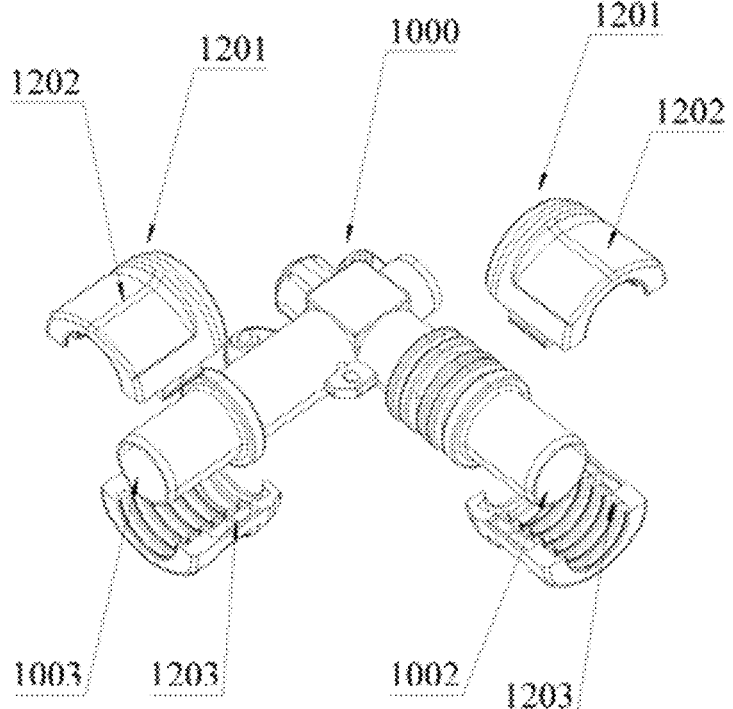
FIG. 7 is a schematic diagram of the explosion structure of the fastening device.

In this embodiment, as shown in FIG. 7, a fastening device 1201 is provided at the joint between the input end 1002 and the oil inlet pipeline 1101 and at the joint between the output end 1003 and the oil outlet pipeline 1102, wherein the fastening device 1201 comprises a clamping piece 1202 and a buckling piece 1203 which is tightly connected with the clamping piece 1202, and the oil inlet pipeline 1101 and the oil outlet pipeline 1102 are fixed by the fastening device 1201. The stability of the whole system can be improved to prevent the pipeline from moving or vibrating during operation, and the fastening device 1201 can provide good sealing performance to prevent liquid or gas from leaking. By matching and fixing the clamping piece 1202 and the buckling piece 1203, the connection strength of the oil inlet pipeline 1101 and the oil outlet pipeline 1102 with the input end 1002 and the output end 1003 can be enhanced, and deformation or damage can be prevented when being subjected to greater pressure.

In other embodiments (not shown in the figures), the input end 1002 and the output end 1003 can also be provided with sealing rings, which can provide better sealing performance and prevent liquid or gas from leaking.

Figure 8:
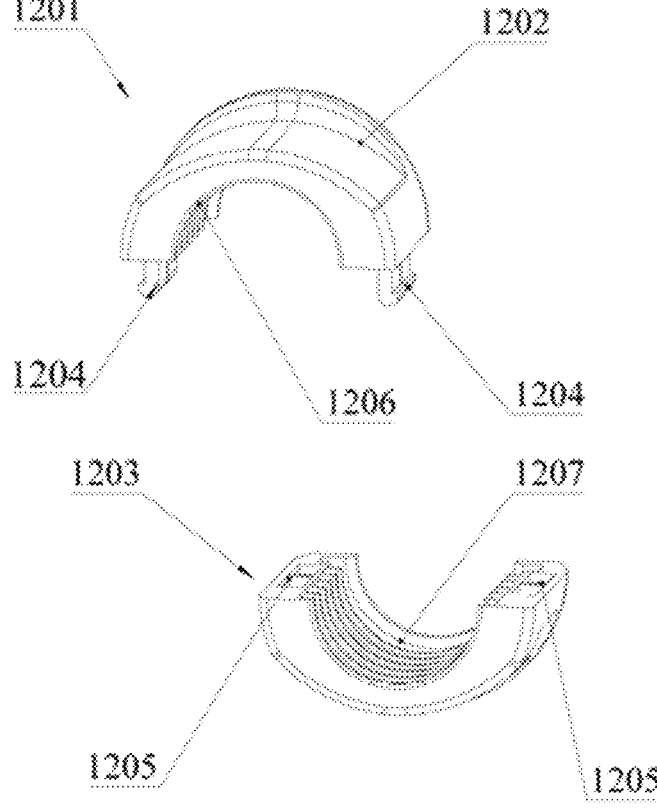
FIG. 8 is a schematic diagram of the explosion structure of the clamping piece and the buckling piece.

In this embodiment, as shown in FIG. 8, two fasteners 1204 are respectively arranged on both sides of the clamping piece 1202, and two grooves 1205 are respectively arranged on both sides of the buckling piece 1203, and the fasteners 1204 are fastened and fixed with the grooves 1205, so that the clamping piece 1202 and the buckling piece 1203 are fixedly connected, and the whole fastening device 1201 is more stably connected through the fastening of the fasteners 1204 and the grooves 1205.

In another embodiment (not shown in the figures), the clamping piece 1202 and the buckling piece 1203 are respectively provided with magnetic attraction parts, and the clamping piece 1202 and the buckling piece 1203 are fixedly connected by magnetic attraction. The magnetic attraction connection mode makes the connection and separation of the clamping piece 1202 and the buckling piece 1203 very convenient and quick, greatly improving the use efficiency. Compared with the traditional physical fastening, the magnetic attraction part has no vulnerable parts, so it has the following advantages. In another embodiment (not shown in the figure), the two sides of the fastener 1204 are respectively provided with three fasteners 1204 or any other desired number, and the two sides of the fastener 1204 are respectively provided with three grooves 1205 or any other desired number.

In this embodiment, the fastener 1204 has a first inner wall surface 1206, and the fastener 1204 has a second inner wall surface 1207. Both the first inner wall surface 1206 and the second inner wall surface 1207 have corrugated structures corresponding to the oil inlet pipeline 1101 and the oil outlet pipeline 1102. By setting the corresponding corrugated structures, the clamping piece 1202 and the buckling piece 1203 can be connected more closely with the oil inlet pipeline 1101 and the oil outlet pipeline 1102, which can be fixed more firmly and liquid leakage can be effectively prevented.

In another embodiment (not shown in the figures), the oil inlet pipeline 1101 and the oil outlet pipeline 1102 are respectively assembled and fixed at the connection ports at the two ends of the adapter 1000 through a flange device, wherein the flange device includes two flanges and a connector connecting the two flanges, and a connector pad is also arranged between the two flanges. The oil inlet pipeline and the oil outlet pipeline are fixed on the adapter through the flange devices, so that the stability of the pipeline in use can be ensured and the pipeline can be prevented from being displaced due to vibration or other external forces.

Figure 9:
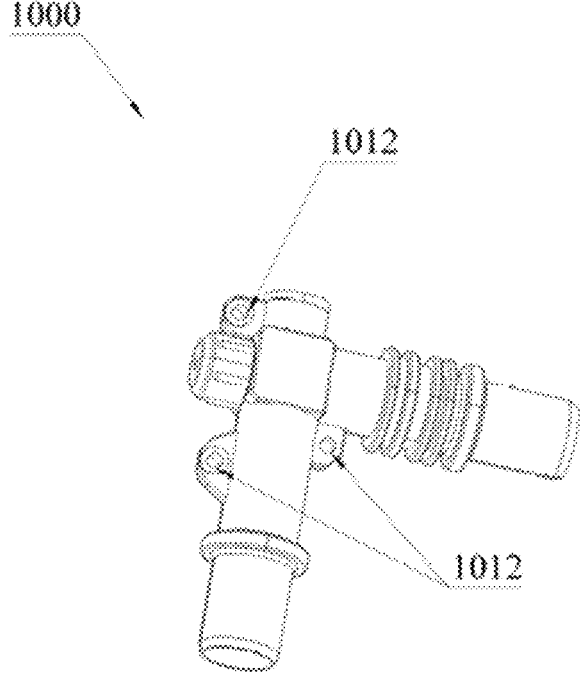
FIG. 9 is a schematic structural view of the mounting hole on the adapter.

In this embodiment, as shown in FIG. 9, the adapter 1000 is also integrally formed with three mounting holes 1012. The mounting holes 1012 make the installation process more convenient and quick, without additional punching or modification, which not only saves the installation time and labor, but also makes the whole device more stable. Moreover, the mounting holes 1012 can provide various installation options, so that the adapter 1000 can adapt to various installation needs and environments.

In other embodiments (not shown in the figures), the mounting holes 1012 can be arranged in four or any other desired number, and the whole device can be connected more firmly by arranging a plurality of mounting holes 1012.

Figure 10:
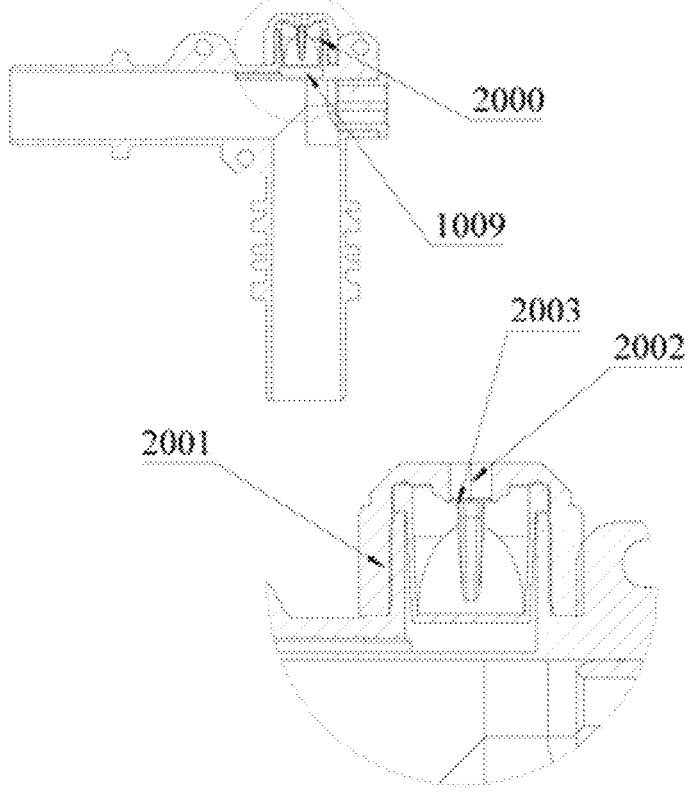
FIG. 10 is a schematic structural view of the air vent cap.

In this embodiment, as shown in FIG. 10, the air vent valve 2000 is covered with an air vent cap 2001, and the top end of the air vent cap 2001 is provided with a first air vent hole 2002, the center of which is located on the input axis 1007. By setting the first air vent hole 2002, external air can enter the inside of the pipeline and take away the heat and harmful gases generated inside the pipeline, thus reducing the working temperature and humidity of the equipment.

In other embodiments (not shown in the figures), the air vent cap 2001 can also be provided with two first air vent holes 2002 or any other desired number.

In this embodiment, a boss 2003 is arranged inside the top end of the air vent cap 2001, and the air vent cap 2001 and the air vent valve 2000 are fixed by the boss 2003, which can provide a stable contact surface, so that the connection between the air vent cap 2001 and the air vent valve 2000 is more stable, and the shaking or displacement that may occur during use is reduced.

Figure 11:
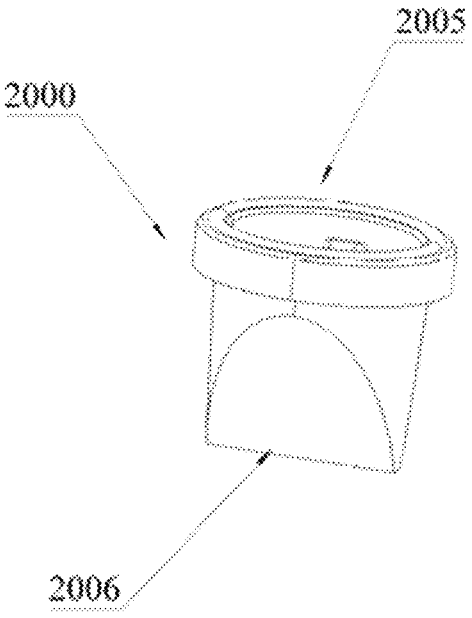
FIG. 11 is a schematic structural view of the air vent valve.

In this embodiment, as shown in FIG. 11, the air vent valve 2000 includes a ventilation end 2005 and a closed end 2006, and the orientation of the closed end 2006 faces the inner cavity of the adapter 1000. The air vent valve 2000 is a one-way soft rubber valve that is normally closed and opened in one direction inward, which can realize that when the motor of the fuel pumpstops working, the liquid in the flow passage will generate negative pressure due to gravity. At this time, the atmospheric pressure on the outside of the air vent valve 2000 will be greater than the negative pressure on the inside of the air vent valve 2000, and the valve will open to let gas enter the flow passage, so that the flow passage is disconnected, which can avoid the siphon phenomenon in the flow passage. When the motor of the pump starts to work, the liquid pressure on the inside of the air vent valve 2000 is greater than the atmospheric pressure on the outside of the machine, which will make the valve stick more tightly and close tightly, so that the liquid will not leak out.

In other embodiments (not shown in the figures), the air vent valve 2000 can be set as a two-way air vent valve, which allows gas or liquid to flow in two directions, which provides greater flexibility and can meet more application requirements, and the two-way air vent valve can better control the flow of gas or liquid, and can adjust the direction of flow as needed, thus improving the efficiency of the system.

Figure 12:
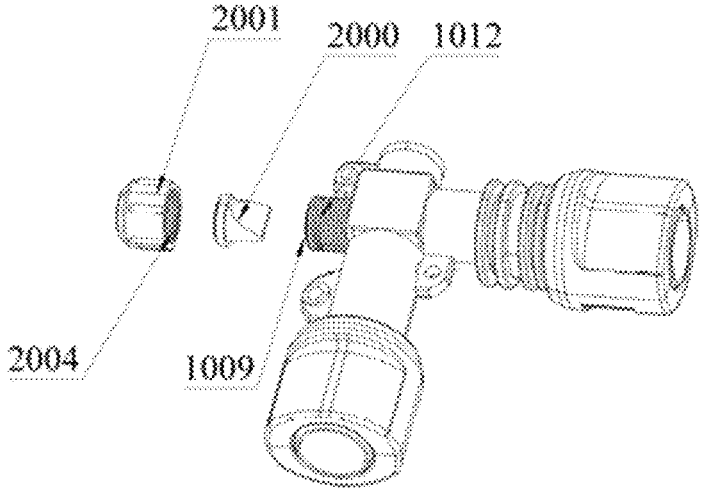
FIG. 12 is a schematic diagram of the connection structure between the air vent cap and the air vent hole in another embodiment.

In other embodiments, as shown in FIG. 12, the air vent cap 2001 is provided with internal threads 2004 and the air vent hole 1009 is provided with external thread 1013. The air vent cap 2001 is connected with the air vent hole 1009 through threaded connection, and the air vent cap 2001 and the air vent hole 1009 are fixedly connected through threaded connection, which can effectively prevent air or other substances from leaking at the interface, improve the sealing performance of the system, and facilitate the disassembly and replacement of the air vent cap 2001.

In other embodiments (not shown in the figures), the outer wall surface of the air vent hole 1009 is provided with a groove, and the inner wall surface of the air vent cap 2001 is provided with a fastener, and the air vent cap 2001 is connected to the air vent hole 1009 through a snap connection mode, which makes the installation and disassembly of the air vent cap very convenient and quick.

In other embodiments (not shown in the figures), a gasket is arranged between the air vent hole 1009 and the air vent cap 2001. By arranging the gasket, air or other substances can be effectively prevented from leaking at the interface, and the sealing performance of the system is improved.

In this embodiment, the air vent valve 2000 is made of soft rubber material, which has good elasticity and flexibility and can provide effective sealing in gaps of various shapes and sizes, and has good wear resistance, aging resistance and chemical corrosion resistance, so the air vent valve 2000 can maintain a long service life under various environmental conditions. In addition, the cost of the soft rubber material is low; and the air vent valve 2000 made of the soft rubber material is usually easy to install and replace, thereby reducing the maintenance cost and time of the device.

In other embodiments (not shown in the figures), the air vent valve 2000 can be made of plastic, which is low in cost and easy to process, and can reduce the production cost. In other embodiments (not shown in the figure), the air vent valve 2000 can also be made of a metal material, which has good mechanical strength and wear resistance, can withstand higher pressure, and can still maintain its excellent performance in the harsh environment of high temperature and high pressure. In other embodiments (not shown in the figure), the air vent valve 2000 can also be made of ceramic material, which has excellent heat resistance and corrosion resistance and can maintain its excellent performance in extreme environments.

Figure 13:
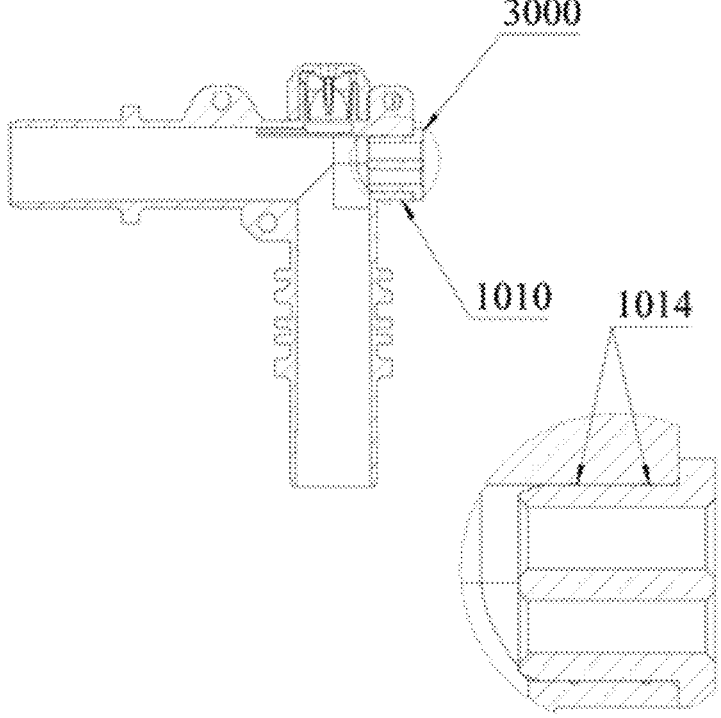
FIG. 13 is a schematic sectional view of the connection between the through hole and the sealing plug.
Figure 14:
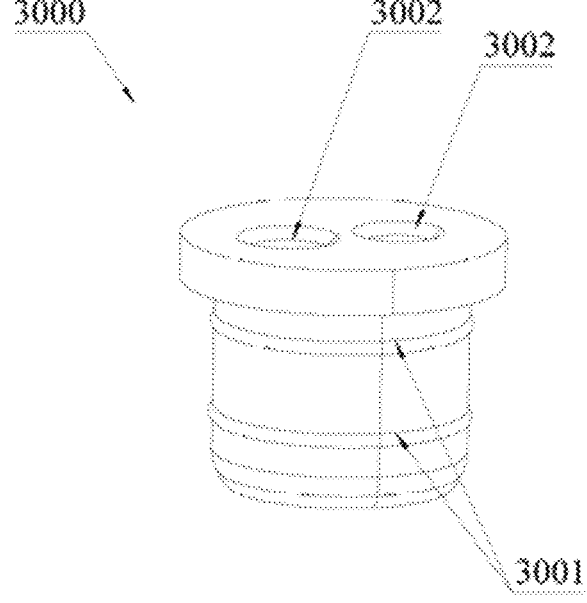
FIG. 14 is a schematic structural view of the sealing plug.

In this embodiment, as shown in FIGS. 13-14, there are two concave parts 1014 on the inner wall surface of the through hole 1010 and two protruding parts 3001 on the outer face of the sealing plug 3000, and the concave parts 1014 receive the protruding parts 3001, so that the sealing plug 3000 is firmly connected with the through hole 1010, and it is not easy to loosen or slide down during use.

In this embodiment, the end position of the sealing plug 3000 is also provided with two second air vent holes 3002. By setting the second air vent holes 3002, the air flow inside the sealing component can be adjusted, the internal and external pressures can be kept in balance, and the sealing component can be prevented from being damaged or invalid due to the pressure difference. If the equipment inside the sealing plug 3000 generates heat during operation, the air vent holes can help dissipate heat and prevent the equipment from being damaged due to overheating.

In other embodiments (not shown in the figures), the end position of the sealing plug 3000 can also be provided with three second air vent holes 3002 or any other desired number, so as to accelerate the heat dissipation of the pipeline.

In this embodiment, the input end 1002 is transverse to the output end 1003. When the input end 1002 and the output end 1003 are arranged transversely, the internal space of the device can be more effectively utilized, thereby reducing the overall size of the device or providing more functions or performances under the same device size.

In this embodiment, the sealing plug 3000 is made of soft rubber material, which has good elasticity and flexibility, can provide effective sealing in gaps of various shapes and sizes, and has good wear resistance, aging resistance and chemical corrosion resistance. In addition, the production cost of soft rubber material is low; and the manufacturing cost of equipment can be reduced by using the sealing plug made of soft rubber material.

In other embodiments (not shown in the figures), the sealing plug 3000 can be made of hard plastic material, which has good wear resistance and aging resistance, and can ensure that the pipeline will not be worn or aged during long-term use. Moreover, the rigidity of the hard plastic material is high, which can ensure that the pipeline will maintain a stable shape during use and will not be deformed due to pressure changes. In addition, compared with rubber materials, the cost of the hard plastic material is lower, which can reduce the whole system.

Figure 15:
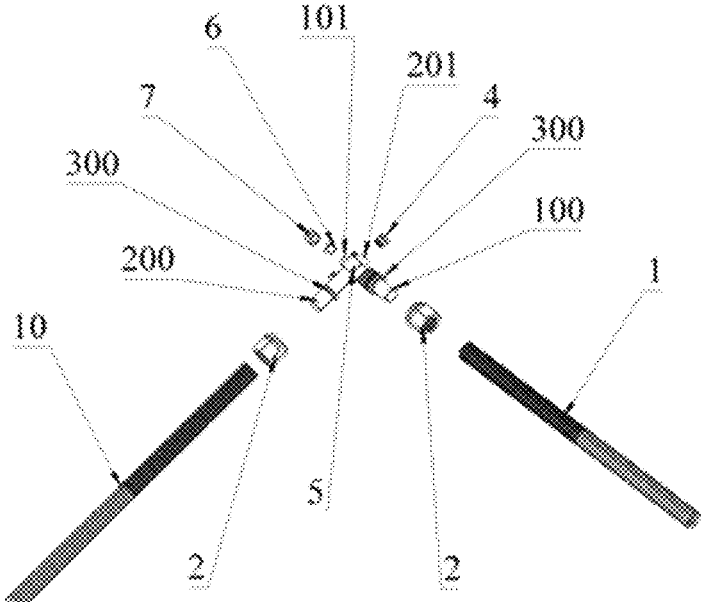
FIG. 15 is a schematic structural view of an fuel pump-flow passage in another embodiment.

The present invention also provides a novel fuel pump-flow channel passage structure, as shown in FIG. 15, which includes an oil inlet corrugated pipeline 1, a lead sealing plug 4, an adapter 5, an air vent valve 6 and an oil outlet corrugated pipeline 10, wherein the oil inlet corrugated pipeline 1 and the oil outlet corrugated pipeline 10 are respectively assembled and fixed at the connection ports at two ends of the adapter 5 by using a fastening piece 2; the adapter 5 is fixedly provided with an oil inlet pipeline 100 of the oil inlet corrugated pipeline 1, and the end wall surface in the axial direction is provided with an air vent hole position 101: an air vent valve 6 equipped with a air vent cap 7 is arranged outside the air vent hole position 101: an oil outlet pipeline 200 of the oil outlet corrugated pipeline 10 is fixedly installed on the adapter 5, a through hole 201 is formed on the end wall surface in the axial direction, and the lead sealing plug 4 is installed in the through hole 201: the inner cavity wall of the fastener 2 corresponds to the corrugated pipeline structure, and a corrugated structure for wedging and fixing is also integrally formed; the outer walls at both ends of the adapter 5 are integrally formed with annular bosses 300 for the fastening piece 2 to be fixedly installed.

Figure 16:
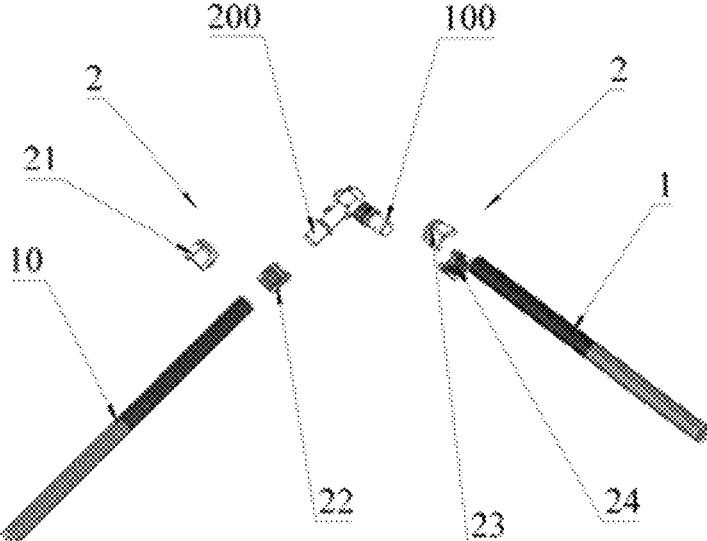
FIG. 16 is a schematic structural view of the fastening piece.

In this embodiment, as shown in FIG. 16, the fastening piece 2 for fixing the oil inlet corrugated pipeline 1 is composed of a first clamping piece 21 and a first mating piece 22, while the fastening piece 2 for fixing the oil outlet corrugated pipeline 10 is composed of a second clamping piece 23 and a second mating piece 24, and the fastening piece 2 is more firmly connected through the mating of the clamping pieces and the mating pieces, thus preventing liquid leakage.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

What is claimed:

1. A novel fuel pumpflow channel passage structure, comprising:
 an adapter, an air vent valve and a sealing plug, wherein
  the adapter comprises a body, an input end and an output end,
  the input end is communicated with the output end through the body,
  the input end of the generally cylindrical inner wall surfaces has a first axial diameter and the output end of the generally cylindrical inner wall surfaces has a second axial diameter, and the input end and the output end define an input pipeline and an output pipeline along the cylindrical inner wall surfaces, wherein the input pipeline defines an input axis continuously passing through a pipeline center of the input pipeline, and the output pipeline defines an output axis continuously passing through a pipeline center of the output pipeline,
  the body is provided with an air vent hole, a hole center of the air vent hole is positioned in a first axial direction of the input axis, and the body is also provided with a through hole, and a hole center of the through hole is positioned in a second axial direction of the output axis,
  the air vent valve is arranged on the air vent hole, and the sealing plug is arranged on the through hole,
  an upper cover of the air vent valve is provided with an air vent cap, a top end of the air vent cap is provided with at least one first air vent hole, and a center of the at least one first air vent hole is positioned on the input axis, and
  a boss is arranged inside the top end of the air vent cap, and the air vent cap and the air vent valve are fixed by the boss.

2. The novel fuel pumpflow channel passage structure according to claim 1, wherein at least one mounting hole is also arranged on the adapter.

3. The novel fuel pumpflow channel passage structure according to claim 1, wherein an inner wall surface of the through hole has at least one concave part.

4. The novel fuel pumpflow channel passage structure according to claim 1, wherein at least one protruding part is arranged on an outer face of the sealing plug, and a concave part receives the at least one protruding part, so that the sealing plug is firmly connected with the through hole.

5. The novel fuel pumpflow channel passage structure according to claim 4, wherein at least one second through hole is further arranged at an end position of the sealing plug.

6. The novel fuel pumpflow channel passage structure according to claim 1, wherein the air vent valve comprises a ventilation end and a closed end, and an orientation of the closed end faces an inner cavity of the adapter.

7. The novel fuel pumpflow channel passage structure according to claim 6, wherein the air vent cap is provided with internal threads, and the air vent hole is provided with external threads, and the air vent cap is connected with the air vent hole by threaded connection.

8. The novel fuel pumpflow channel passage structure according to claim 6, wherein the air vent valve is made of a soft rubber material.

9. The novel fuel pumpflow channel passage structure according to claim 1, wherein the input end and the output end are respectively provided with annular bosses.

10. The novel fuel pumpflow channel passage structure according to claim 9, wherein, the input end is communicated with an oil inlet pipeline, and the output end is communicated with an oil outlet pipeline, and the oil inlet pipeline and the oil outlet pipeline have corrugated structures with equal intervals, and inner diameters of the oil inlet pipeline and the oil outlet pipeline are not less than outer diameters of the input end and the output end.

11. The novel fuel pumpflow channel passage structure according to claim 10, wherein both the oil inlet pipeline and the oil outlet pipeline are made of a corrosion-resistant metal material.

12. The novel fuel pumpflow channel passage structure according to claim 11, wherein fastening devices are arranged at a joint between the input end and the oil inlet pipeline and at a joint between the output end and the oil outlet pipeline, wherein the fastening devices comprise a clamping piece and a buckling piece which is tightly connected with the clamping piece.

13. The novel fuel pumpflow channel passage structure according to claim 12, wherein at least one fastener is arranged on the clamping piece, and at least one groove is arranged on the buckling piece, and each of the at least one fastener is fastened and fixed with a respective one of the at least one groove, so that the clamping piece is fixedly connected with the buckling piece.

14. The novel fuel pumpflow channel passage structure according to claim 13, wherein the clamping piece has a first inner wall surface, the buckling piece has a second inner wall surface, and both the first inner wall surface and the second inner wall surface have corrugated structures corresponding to the oil inlet pipeline and the oil outlet pipeline.

15. A novel fuel pumpflow channel passage structure, the novel fuel pumpflow channel passage structure comprising:
    an oil inlet corrugated pipeline, a lead sealing plug, an adapter, an air vent valve and an oil outlet corrugated pipeline, wherein connecting ports at both ends of the adapter are respectively assembled and fixed by using clamping pieces, the oil inlet corrugated pipeline and the oil outlet corrugated pipeline are respectively assembled and fixed at connection ports at two ends of the adapter by using fastening pieces; and the adapter is fixedly provided with an oil inlet pipeline of the oil inlet corrugated pipeline, and an end wall surface in the axial direction is provided with an air vent hole position, an air vent valve equipped with an air vent cap is arranged outside the air vent hole position; and the adapter is fixedly provided with an oil outlet pipeline of the oil outlet corrugated pipeline, and the end wall surface in the axial direction of the adapter is provided with a through hole, and the lead sealing plug is installed in the through hole, an inner cavity wall of the fastening piece corresponds to the structure of the corrugated pipeline, and a corrugated structure for wedging and fixing is also integrally formed, outer walls at both ends of the adapter are integrally formed with annular bosses for the fastening piece to be fixedly installed.

16. The novel fuel pumpflow channel passage structure according to claim 15, wherein the fastening piece for fixing the oil inlet corrugated pipeline consists of a first clamping piece and a first mating piece, while the fastening piece for fixing the oil outlet corrugated pipeline consists of a second clamping piece and a second mating piece.

* * * * *